United States Patent
Li

(10) Patent No.: US 7,856,141 B2
(45) Date of Patent: *Dec. 21, 2010

(54) METHOD FOR ADJUSTING SATURATION AND CONTRAST OF AN AREA OF AN IMAGE AND APPARATUS THEREOF

(75) Inventor: Keh-Tsong Li, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/550,401

(22) Filed: Aug. 30, 2009

(65) Prior Publication Data
US 2009/0322952 A1    Dec. 31, 2009

Related U.S. Application Data

(63) Continuation-in-part of application No. 11/834,693, filed on Aug. 7, 2007, now Pat. No. 7,602,988.

(60) Provisional application No. 60/824,298, filed on Sep. 1, 2006.

(51) Int. Cl.
*G06K 9/00* (2006.01)

(52) U.S. Cl. ..................................... 382/167

(58) Field of Classification Search ......... 382/162–167, 382/274–275, 254, 260–266, 100; 358/516–521; 345/589–604; 348/582, 450, 488, 602–630
See application file for complete search history.

(56) References Cited

U.S. PATENT DOCUMENTS

| | | | | |
|---|---|---|---|---|
| 5,271,064 | A | * 12/1993 | Dhawan et al. | ............. 382/266 |
| 5,930,402 | A | 7/1999 | Kim | |
| 7,428,333 | B2 | 9/2008 | Asari | |
| 2003/0142879 | A1 | 7/2003 | Kim | |
| 2004/0013298 | A1 | 1/2004 | Choe et al. | |
| 2005/0163393 | A1 | 7/2005 | Asari | |
| 2005/0248551 | A1 | 11/2005 | Pasqualini et al. | |
| 2006/0146193 | A1 | 7/2006 | Weerasinghe et al. | |

* cited by examiner

*Primary Examiner*—Sherali Ishrat
(74) *Attorney, Agent, or Firm*—Winston Hsu; Scott Margo

(57) ABSTRACT

A method for adjusting saturation of an area of an image is disclosed. The method includes calculating a deviation level of a pixel in the area of the image by a processor and calculating a modified saturation value of the pixel in the area of the image according to the deviation level of the pixel in the area of the image and an original saturation value of the pixel in the area of the image by the processor. The deviation level indicates brightness differences of the brightness values among the pixel and a pixel set in a vicinity of the pixel in the area of the image. The pixel set includes pixels in the vicinity of the pixel of the area of the image.

20 Claims, 5 Drawing Sheets

METHOD FOR ADJUSTING SATURATION AND CONTRAST OF AN AREA OF AN IMAGE AND APPARATUS THEREOF

CROSS REFERENCE TO RELATED APPLICATIONS

This application claims the benefit of U.S. Provisional Application No. 60/824,298, filed 2006 Sep. 1 and U.S. application Ser. No. 11/834,693, filed 2007 Aug. 7 now U.S. Pat. No. 7,602,988, included herein in their entirety by reference.

BACKGROUND OF THE INVENTION

1. Field of the Invention

The present invention provides a method for adjusting saturation and contrast of an area of an image, and more particularly, a method for adjusting brightness and saturation of a pixel in the area of the image to achieve saturation and contrast adjustment of the area of the image according to a brightness deviation level between the pixel and a pixel set in the vicinity of the pixel.

2. Description of the Prior Art

When high definition (HD) applications are becoming more and more popular, image quality displayed by an electronic device is higher and higher. Most devices include various preference settings for different users. Products for displaying images, like a television, a projector or a computer display, usually provide a user with an interface to adjust contrast, saturation or other parameters to make the screen output closer to expectations of the user.

In conventional designs to adjust contrast of a screen, some statistical data of an image are calculated and then the brightness parameter of each pixel is multiplied with a factor that is looked up from a table or calculated using a function. Adjustment of saturation of an image on a screen is performed similarly. If there is better way to enhance such adjustments, users may have better experiences when using enhanced apparatuses having higher image quality.

SUMMARY OF THE INVENTION

A first preferred embodiment is a method for adjusting saturation of an area of an image to be displayed in an electronic system. The electronic system comprises a storage unit for storing information of the image. The method comprises calculating a deviation level of a pixel in the area of the image, and calculating a modified saturation value of the pixel in the area of the image according to the deviation level of the pixel in the area of the image and an original saturation value of the pixel in the area of the image to achieve saturation adjustment of the pixel in the area of the image. The deviation level indicates brightness differences of the brightness values among the pixel and a pixel set in a vicinity of the pixel in the area of the image. The pixel set comprises pixels in the vicinity of the pixel of the area of the image.

A second preferred embodiment is a method for adjusting contrast of an area of an image, comprising: calculating a local contrast of a pixel set in a vicinity of a pixel by a processor, wherein the pixel is selected from the area and the pixel set is distributed in a portion of the area; calculating a global gain for the area according to brightness characteristic of the area by the processor; and calculating a modified brightness value of the pixel according to the local contrast, the global gain and an original brightness value of the pixel by the processor, so that contrast of the pixel is adjusted with the modified brightness value of the pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
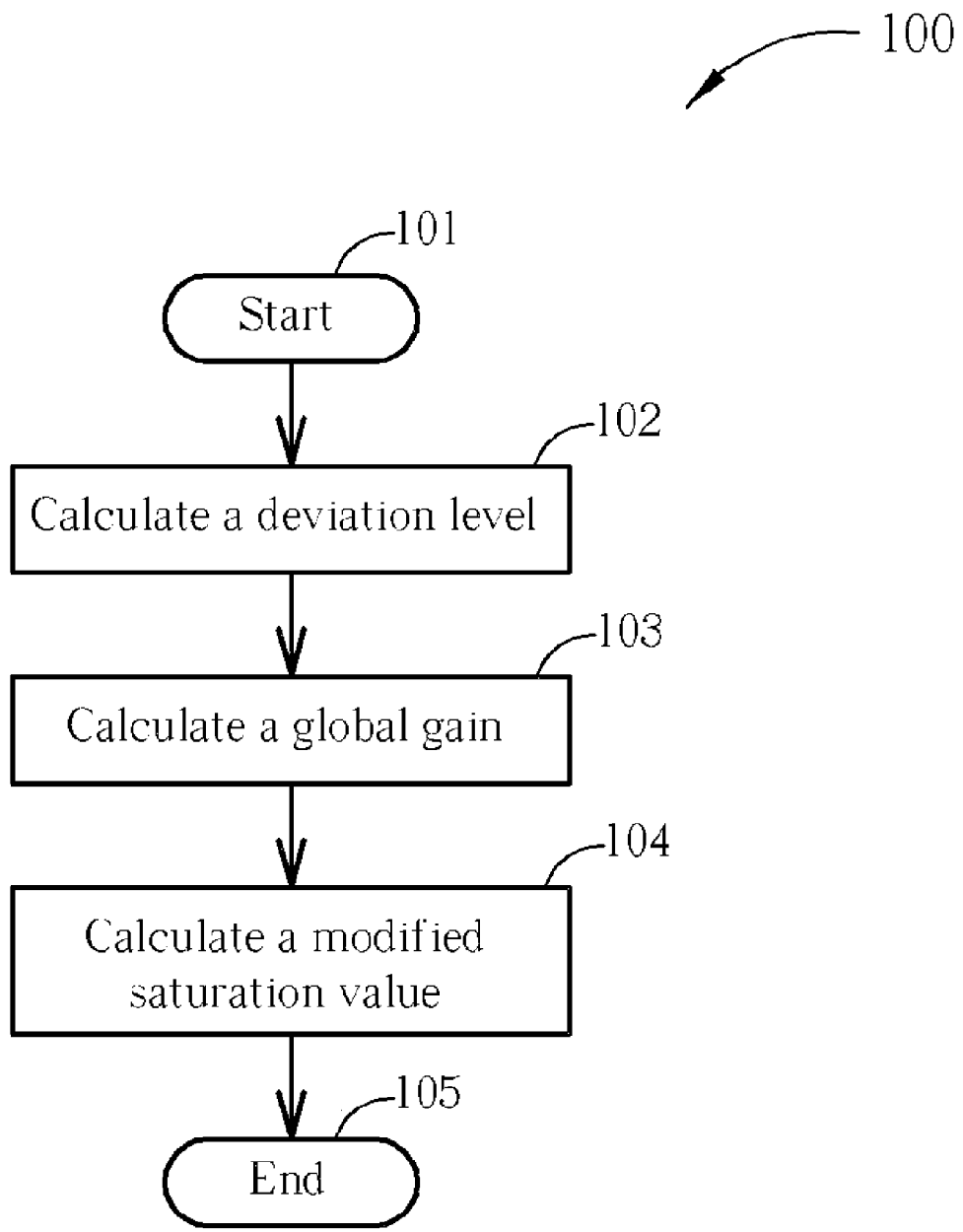
FIG. 1 is a flowchart illustrating a method for adjusting saturation of an area of an image according to a first embodiment of the present invention.

Please refer to FIG. 1. FIG. 1 is a flowchart illustrating a method 100 for adjusting saturation of an area of an image according to a first embodiment of the present invention. The image mentioned in the present invention can comprise only one area or a plurality of areas. The area mentioned in the present invention does not have to be rectangular, and instead, the area can be any shape as desired. The spirit of method 100 according to the first embodiment of the present invention is utilizing the brightness (or luminance or intensity) difference between a pixel in the area and a pixel set in the vicinity of the pixel to adjust the saturation of the area. Additionally, the brightness and the saturation mentioned in the present invention can be expressed and defined in different color spaces such RGB, HSV, and $YC_bC_r$. The transformations for saturation and brightness between different color spaces are familiar for those skilled in the art and are omitted.

It is assumed that an area A, a pixel $P_{xy}$ in the area A, and a pixel set $P_{mn}$ of the pixel $P_{xy}$ is selected. The steps are described as follows:

Step 101: Start;
Step 102: Calculate a deviation level of the pixel $P_{xy}$ in an area;
Step 103: Calculate a global gain for the area A;
Step 104: Calculate a modified saturation value of the pixel according to the deviation level, the global gain and an original saturation value of the pixel;
Step 105: End.

In step 103, the global gain can be obtained according to the characteristics of the area A, for example, the size of the global gain can be decided with the saturation average of the area A.

Therefore, the method 100 can be expressed in the following expressions (1), (2), or (3):

$$S_{modified} = S_{original} \times C_{global\_gain} \times D \qquad (1)$$

$$S_{modified} = S_{original} \times [1 + (C_{global\_gain} - 1) \times D] \qquad (2)$$

$$S_{modified} = S_{original} \times D \qquad (3)$$

wherein $S_{modified}$ designates the modified saturation value of the pixel $P_{xy}$, $S_{original}$ designates the original saturation value of the pixel $P_{xy}$, $C_{global\_gain}$ designates the global gain for the area, and D designates the deviation level of the pixel $P_{xy}$.

In the expression (1), the modified saturation value $S_{modified}$ can be adjusted as the global gain $C_{global\_gain}$ adjusts.

In the expression (2), the modified saturation value $S_{modified}$ remains unchanged when the global gain $C_{global\_gain}$ is set to be 1, and therefore the expression (2) ignores the deviation level D when the global gain $C_{global\_gain}$ is set to be 1.

In the expression (3), the modified saturation value $S_{modified}$ can be modified only according to the deviation level and ignore the global gain $C_{global\_gain}$.

Figure 2:
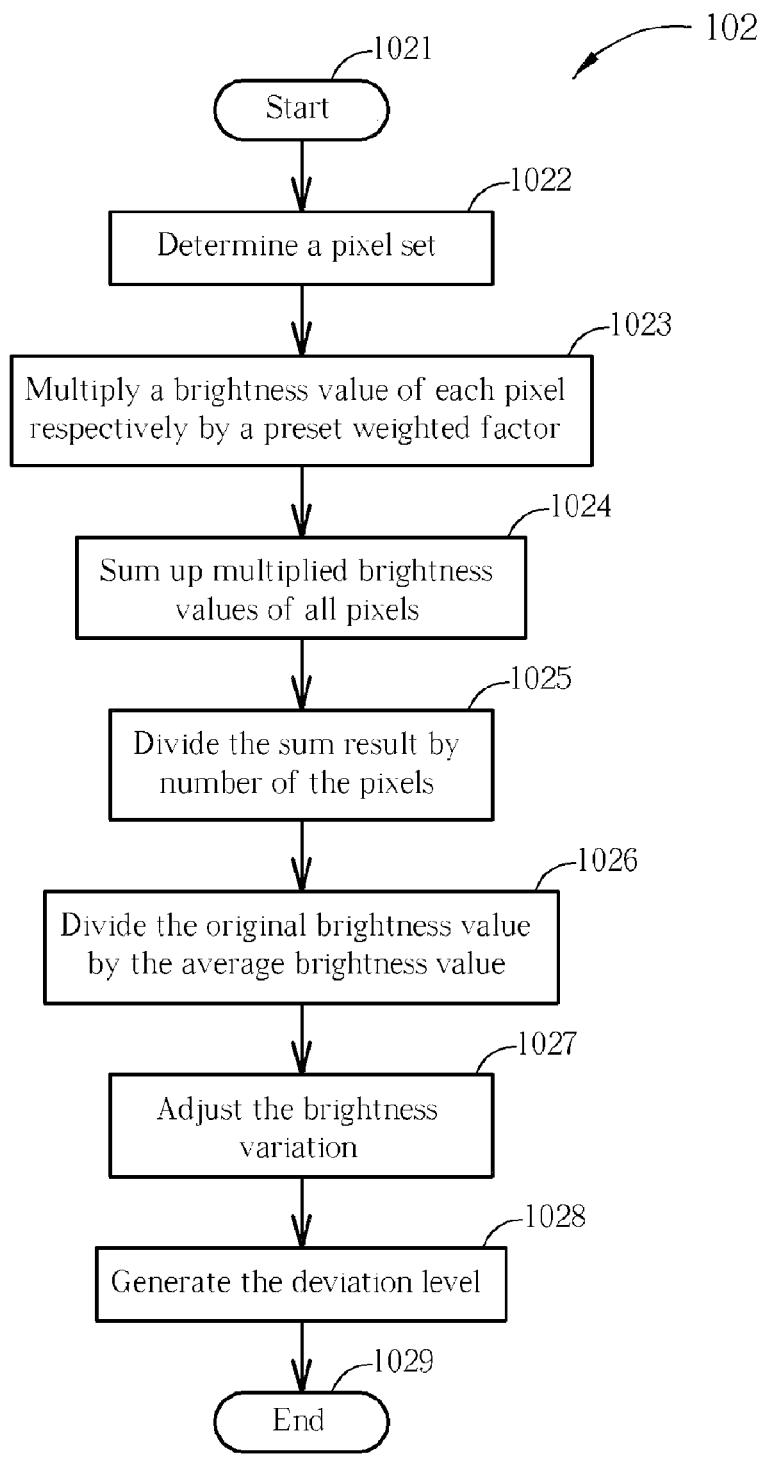
FIG. 2 is a flowchart illustrating detailed steps for generating the deviation level.

In step 102, the deviation level of the selected pixel $P_{xy}$ is generated according to the brightness differences between the selected pixel $P_{xy}$ and a pixel set $P_{mn}$ in the vicinity of the selected pixel $P_{xy}$. Please refer to FIG. 2. FIG. 2 is a flowchart illustrating detailed steps of step 102 for generating the deviation level. The steps are described as follows:

Step 1021: Start;
Step 1022: Determine a pixel set $P_{mn}$ corresponding to the selected pixel $P_{xy}$ according to a predetermined rule;
Step 1023: Multiply a brightness value of each pixel in the pixel set $P_{mn}$ respectively by a preset weighted factor;
Step 1024: Sum up multiplied brightness values of all pixels in the pixel set for generating a sum result;
Step 1025: Divide the sum result by the number of the pixels in the pixel set for generating an average brightness value $M_{mn}$;
Step 1026: Divide the original brightness value $B_{original}$ of the pixel $P_{xy}$ by the average brightness value $M_{mn}$ for generating a brightness variation V;
Step 1027: Adjust the brightness variation V to generate an adjusted brightness variation F;
Step 1028: Generate the deviation level according to a following equation: $D=1+C_{local\_gain} \times F$, wherein D represents the deviation level, $C_{local\_gain}$ represents a local gain, and F represents the adjusted brightness variation;
Step 1029: End.

In Step 1022~1025, weighted-averaging process are executed onto the brightness values of the pixels in the pixel set $P_{mn}$ for generating an average brightness value.

In Step 1026~1028, the original brightness value $B_{original}$ of the selected pixel $P_{xy}$ is compared with the average brightness value $M_{mn}$ for generating the deviation level D.

In Step 1022, the pixel set $P_{mn}$ can be determined by a predetermined rule. For example, the pixel set can comprise pixels peripheral to the selected pixel such as $P_{(x-1,y-1)}$, $P_{(x-1,y+1)}$, $P_{(x+1,y-1)}$, and $P_{(x+1,y+1)}$.

In Step 1023, the brightness value $B_{ij}$ of each pixel $P_{ij}$ in the pixel set $P_{mn}$ is respectively multiplied by a corresponding preset weighted factor $a_{ij}$.

In step 1026, dividing the original brightness value $B_{original}$ of the pixel $P_{xy}$ by the average brightness value $M_{mn}$ for generating the brightness variation can be expressed in the following expressions (3) or (4):

$$V=B_{original}/M_{mn} \quad (3)$$

$$V=B_{original}/(M_{mn}+C_{anti\_noise}) \quad (4)$$

wherein V designates the brightness variation, $B_{original}$ designates the original brightness of the pixel $P_{xy}$, $M_{mn}$ designates the average brightness value, and $C_{anti\_noise}$ designates a constant.

For noise issues, the expression (4) is added into a constant $C_{anti\_noise}$ to reduce noise effects in the area.

In step 1027, to adjust the brightness variation V is to limit the brightness variation within an appropriate range. The adjusted brightness variation F can be derived from taking the log of the brightness variation as the following expression: $F=\log(V)$. Therefore, the adjusted brightness variation F falls in an appropriate range.

Therefore, from the foregoing, it is well understood that the saturation of the area A of the image can be enhanced according to the local contrast.

Figure 3:
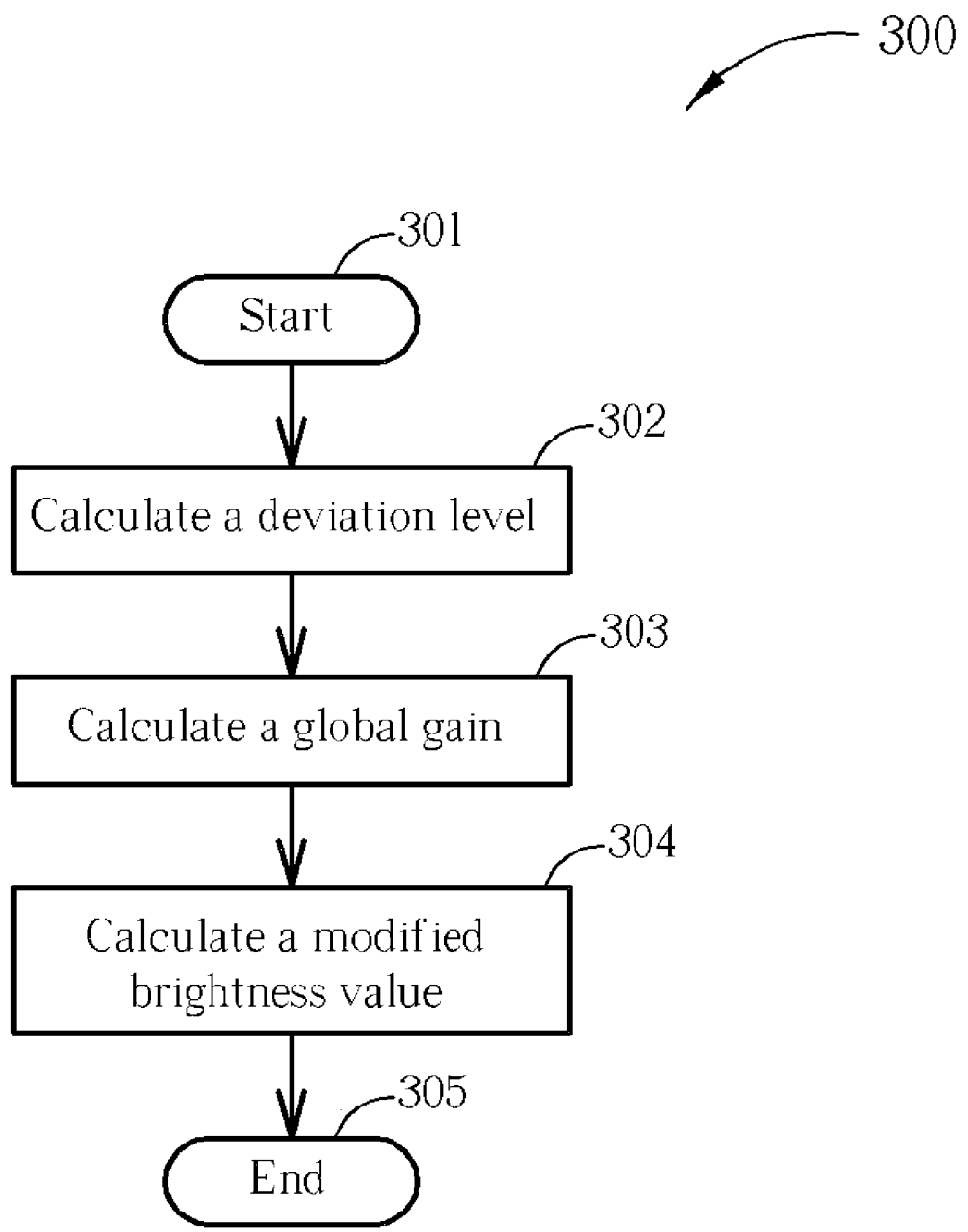
FIG. 3 is a flowchart illustrating a method for adjusting contrast of an area of an image according to a second embodiment of the present invention.

Please refer to FIG. 3. FIG. 3 is a flowchart illustrating a method 300 for adjusting contrast of an area of an image according to a second embodiment of the present invention. The image mentioned in the present invention can comprise only one area or a plurality of areas. The area mentioned in the present invention does not have to be rectangular, and instead, the area can be any shape as desired. The spirit of method 300 according to the second embodiment of the present invention is adjusting the contrast of the area according to the global gain and the local gain. The method 300 utilizes (1) the brightness differences between a pixel in the area and a pixel set in the vicinity of the pixel, to where the local gain applies, and (2) the brightness characteristic of the area, to where the global gain applies, to adjust the contrast of the area. Additionally, the brightness mentioned in the present invention can be expressed and defined in different color spaces such RGB, HSV, and $YC_bC_r$. The transformations for brightness between different color spaces are familiar for those skilled in the art and are omitted.

It is assumed that an area A, a pixel $P_{xy}$ in the area A, and a pixel set $P_{mn}$ of the pixel $P_{xy}$ is selected. The steps are described as follows:

Step 301: Start;
Step 302: Calculate a deviation level of the pixel $P_{xy}$ in an area;
Step 303: Calculate a global gain for the area A;
Step 304: Calculate a modified brightness value of the pixel according to the deviation level, the global gain and an original brightness value of the pixel;
Step 305: End.

In step 303, the global gain can be obtained according to the brightness characteristic of the area A, for example, if the brightness average of the area A is lower, the global gain is higher, and vice versa.

Therefore, the method 300 can be expressed in the following expressions (5) or (6):

$$B_{modified}=B_{original} \times C_{global\_gain} \times D \quad (5)$$

$$B_{modified}=B_{original} \times [1+(C_{global\_gain}-1) \times D] \quad (6)$$

wherein $B_{modified}$ designates the modified brightness value of the pixel $P_{xy}$, $B_{original}$ designates the original brightness value of the pixel $P_{xy}$, $C_{global\_gain}$ designates the global gain for the area, and D designates the deviation level of the pixel $P_{xy}$.

In the expression (5), the modified brightness value $B_{modified}$ can be adjusted as the global gain $C_{global\_gain}$ adjusts. In the expression (6), the modified brightness value $B_{modified}$ remains unchanged when the global gain $C_{global\_gain}$ is set to be 1, and therefore the expression (6) ignores the deviation level D when the global gain $C_{global\_gain}$ is set to be 1.

Figure 4:
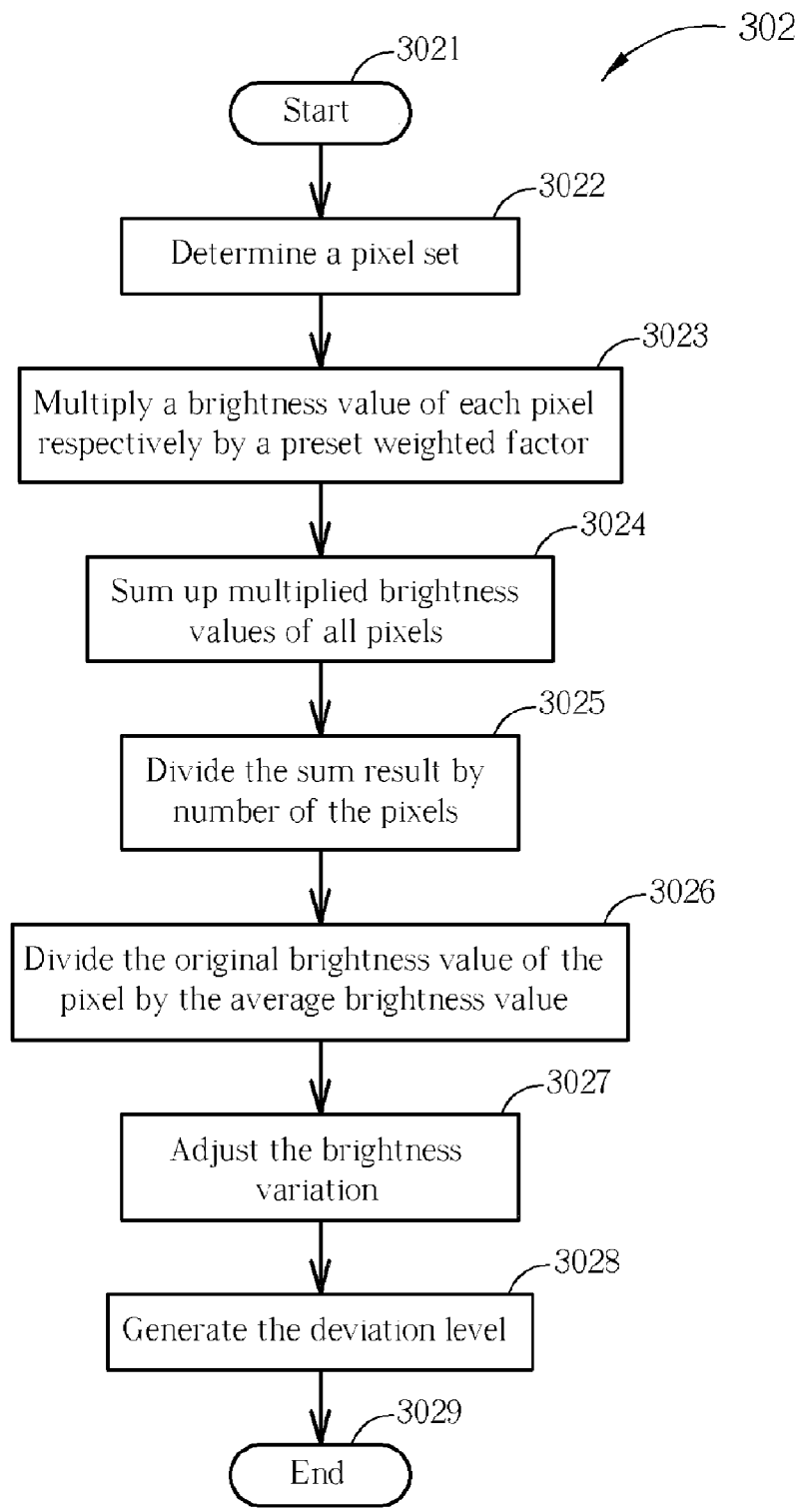
FIG. 4 is a flowchart illustrating detailed steps for generating the deviation level.

In step 302, the deviation level of the selected pixel $P_{xy}$ is generated according to the brightness differences between the selected pixel $P_{xy}$ and a pixel set $P_{mn}$ in the vicinity of the selected pixel $P_{xy}$. Please refer to FIG. 4. FIG. 4 is a flowchart illustrating detailed steps of step 302 for generating the deviation level. The steps are described as follows:

Step 3021: Start;
Step 3022: Determine a pixel set $P_{mn}$ of the selected pixel $P_{xy}$ according to a predetermined rule;

Step 3023: Multiply a brightness value of each pixel in the pixel set $P_{mn}$ respectively by a preset weighted factor;

Step 3024: Sum up multiplied brightness values of all pixels in the pixel set for generating a sum result;

Step 3025: Divide the sum result by the number of the pixels in the pixel set for generating an average brightness value $M_{mn}$;

Step 3026: Divide the original brightness value $B_{original}$ of the pixel by the average brightness value $M_{mn}$ for generating a brightness variation V;

Step 3027: Adjust the brightness variation V to generate an adjusted brightness variation F;

Step 3028: Generate the deviation level according to a following equation: $D=1+C_{local\_gain} \times F$, wherein D represents the deviation level, $C_{local\_gain}$ represents a local gain, and F represents the adjusted brightness variation;

Step 3029: End.

In Step 3022~3025, weighted-averaging process are executed onto the brightness values of the pixels in the pixel set $P_{mn}$ for generating an average brightness value.

In Step 3026~3028, the original brightness value $B_{original}$ of the selected pixel $P_{xy}$ is compared with the average brightness value $M_{mn}$ for generating the deviation level D.

In Step 3022, the pixel set $P_{mn}$ can be determined by a predetermined rule. For example, the pixel set can comprise pixels peripheral to the selected pixel such as $P_{(x-1,y-1)}$, $P_{(x-1,y+1)}$, $P_{(x+1,y-1)}$, and $P_{(x+1,y+1)}$. Alternatively, the pixel set is distributed in a portion of the area of the image. For example, the pixel set includes multiple pixels that are only a part of pixels in the area of the image. For another example, pixels in the pixel set are fall within the scope of the area of the image but are not all pixels in the area of the image.

In Step 3023, the brightness value $B_{ij}$ of each pixel $P_{ij}$ in the pixel set $P_{mn}$ is respectively multiplied by a corresponding preset weighted factor $a_{ij}$.

In step 3026, dividing the original brightness value $B_{original}$ of the pixel $P_{xy}$ by the average brightness value $M_{mn}$ for generating the brightness variation V can be expressed in the following expressions (7) or (8):

$$V=B_{original}/M_{mn} \qquad (7)$$

$$V=B_{original}/(M_{mn}+C_{anti\_noise}) \qquad (8)$$

wherein V designates the brightness variation, $B_{original}$ designates the original brightness of the pixel $P_{xy}$, $M_{mn}$ designates the average brightness value, and $C_{anti\_noise}$ designates a constant.

For noise issues, the expression (8) is added into a constant $C_{anti\_noise}$ to reduce noise effects in the area.

In step 3027, to adjust the brightness variation V is to limit the brightness variation within an appropriate range. The adjusted brightness variation F can be derived from taking the log of the brightness variation as the following expression: $F=\log(V)$. Therefore, the adjusted brightness variation F falls in an appropriate range.

Therefore, from the foregoing, it is well understood that the contrast of the area A of the image can be enhanced according to the local contrast and the brightness characteristic of the area.

Figure 5:
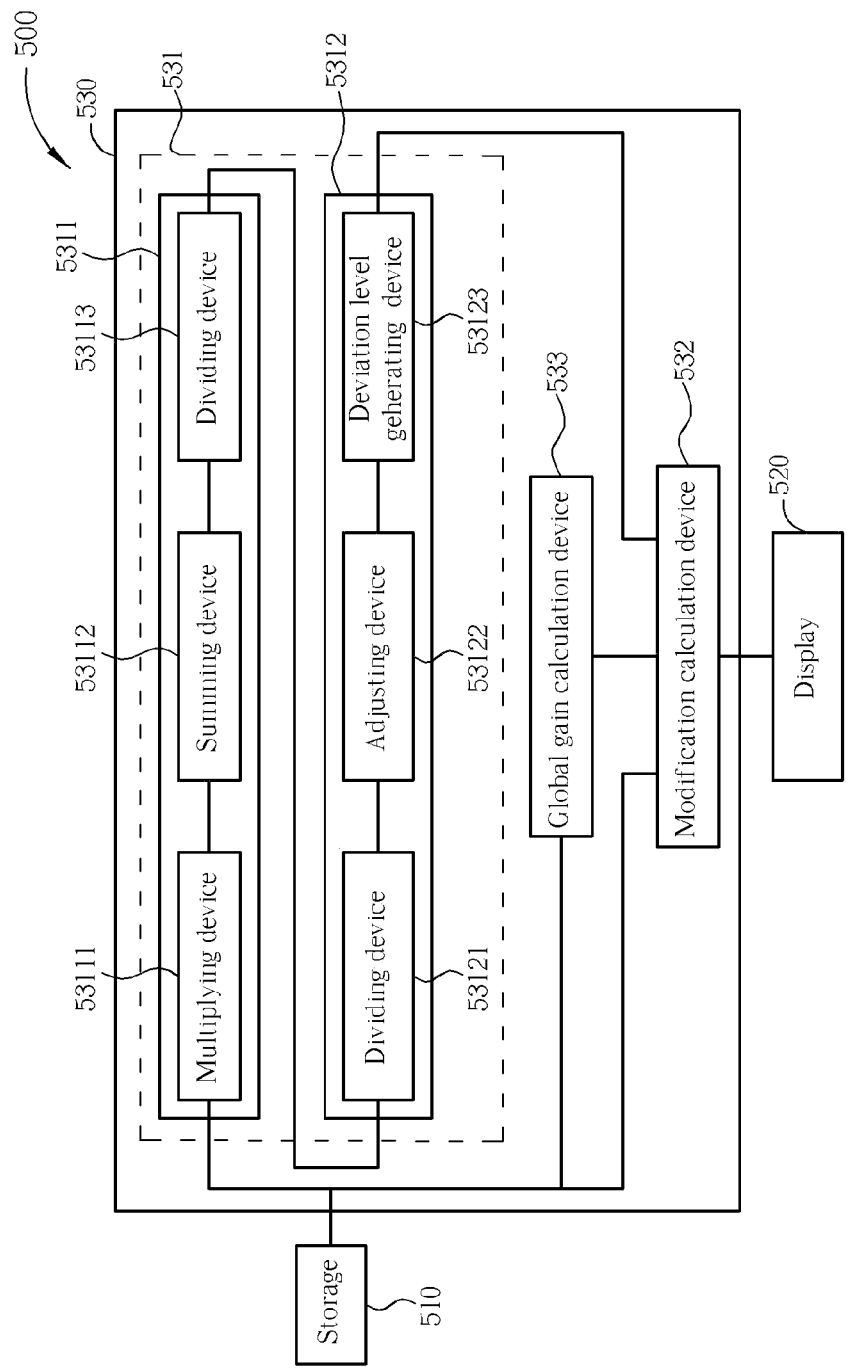
FIG. 5 is a diagram illustrating an electronic apparatus according to the first embodiment of the present invention.

Please refer to FIG. 5. FIG. 5 is a diagram illustrating an electronic apparatus 500 according to the first embodiment of the present invention. The electronic apparatus 500 comprises a storage unit 510, a display 520, and a processor 530. The electronic apparatus 500 can be realized with a TV set, a computer, a cellular phone, or a Personal Digital Assistant (PDA). The storage unit 510 is disposed for storing information of the image. The display 520 is disposed for showing the image. The processor 530 is disposed for modifying saturation of an area A of an image.

The processor 530 comprises a deviation calculation device 531, a modification calculation device 532, and a global gain calculating device 533. The deviation calculation device 531 is disposed for calculating a deviation level D of a pixel $P_{xy}$ in the area A of the image. The modification calculation device 532 is disposed for calculating a modified saturation value $S_{modified}$ of the pixel $P_{xy}$ in the area A. The global gain calculation device 533 is disposed for calculating a global gain $C_{global\_gain}$ for the area A of the image.

The deviation calculation device 531 comprises a weighted-averaging device 5311 and a comparing device 5312. The weighted-averaging device 5311 is disposed for weighted-averaging brightness values of the pixels in the pixel set $P_{mn}$ so as to generate the average brightness value $M_{mn}$. The comparing device 5312 is disposed for comparing the original brightness value $B_{original}$ of the pixel $P_{xy}$ with the average brightness value $M_{mn}$ so as to generate the deviation level D.

The weighted-averaging device 5311 comprises a multiplying device 53111, a summing device 53112, and a dividing device 53113. The multiplying device 53111 is disposed for multiplying a brightness value of each pixel in the pixel set $P_{mn}$ respectively by a preset weighted factor. The summing device 53112 is disposed for summing up multiplied brightness values of all pixels in the pixel set $P_{mn}$ for generating a sum result. The dividing device 53113 is disposed for dividing the sum result by the number of the pixels in the pixel set for generating average brightness value $M_{mn}$.

The comparing device 5312 comprises a dividing device 53121, an adjusting device 53122, and a deviation level generating device 53123. The dividing device 53121 is disposed for dividing the original brightness value $B_{original}$ of the pixel $P_{xy}$ by the average brightness value $M_{mn}$ or by the average brightness value $M_{mn}$ and an anti-noise constant for generating a brightness variation V according to the following expressions: $V=(B_{original}/M_{mn})$ or $V=[B_{original}/(M_{mn}+C_{anti\_noise})]$. The adjusting device 53122 is disposed for adjusting the brightness variation V to generate an adjusted brightness variation F according to the following equation: $F=\log(V)$. The deviation level generating device 53123 is disposed for generating the deviation level D according to a following expression: $D=1+C_{local\_gain} \times F$, wherein D represents the deviation level, $C_{local\_gain}$ represents a local gain, and F represents the adjusted brightness variation.

The modification calculation device 532 calculates the modified saturation value $S_{modified}$ of the pixel $P_{xy}$ in the area A of the image selectively according to the following equations:

$$S_{modified}=S_{original} \times D, \qquad (1)$$

$$S_{modified}=S_{original} \times C_{global\_gain} \times D, \text{ or} \qquad (2)$$

$$S_{modified}=S_{original} \times [1+(C_{global\_gain}-1) \times D], \qquad (3)$$

wherein $S_{modified}$ designates the modified saturation value, $S_{original}$ designates the original saturation value, $C_{global\_gain}$ designates the global gain, and D designates the deviation level.

To sum up, the present invention provides a method to enhance saturation of an area of an image according to the local contrast of the area and the saturation characteristic of the area. Furthermore, the present invention provides another method to enhance contrast of an area of an image according to the local contrast of the area and the brightness characteristic of the area. The two methods both increase efficiency and convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting saturation of an area of an image for the image to be displayed in an electronic system, the electronic system comprising a storage unit for storing information of the image and a processor, the method comprising:
    calculating a deviation level of a pixel in the area of the image by the processor, the deviation level indicating brightness differences of the brightness values among the pixel and a pixel set in a vicinity of the pixel in the area of the image, the pixel set comprising pixels in the vicinity of the pixel of the area of the image; and
    calculating a modified saturation value of the pixel in the area of the image according to the deviation level of the pixel in the area of the image and an original saturation value of the pixel in the area of the image to achieve saturation adjustment of the pixel in the area of the image by the processor.

2. The method of claim 1 wherein calculating the deviation level of the pixel in the area of the image comprises:
    weighted-averaging brightness values of the pixels in the pixel set for generating an average brightness value; and
    comparing an original brightness value with the average brightness value for generating the deviation level.

3. The method of claim 2 wherein weighted-averaging the brightness values of the pixels in the pixel set for generating the average brightness value comprises:
    multiplying a brightness value of each pixel in the pixel set respectively by a preset weighted factor;
    summing up multiplied brightness values of all pixels in the pixel set for generating a sum result; and
    dividing the sum result by a number of the pixels in the pixel set for generating the average brightness value.

4. The method of claim 2 wherein comparing the original brightness value with the average brightness value for generating the deviation level comprises:
    dividing the original brightness value of the pixel by the average brightness value for generating a brightness variation;
    adjusting the brightness variation to generate an adjusted brightness variation; and
    generating the deviation level according to a following equation: $D=1+C\times F$, wherein D represents the deviation level, C represents a local gain, and F represents the adjusted brightness variation.

5. The method of claim 2 wherein comparing the original brightness value with the average brightness value for generating the deviation level comprises:
    dividing the original brightness value of the pixel by the average brightness value and an anti-noise factor for generating an brightness variation;
    adjusting the brightness variation to generate an adjusted brightness variation; and
    generating the deviation level according to a following equation: $D=1+L\times F$, wherein D represents the deviation level, L represents a local gain, and F represents the adjusted brightness variation.

6. The method of claim 1 wherein calculating a modified saturation value of the pixel in the area of the image according to the deviation level and the original saturation value of the pixel comprises calculating a modified saturation value of the pixel of the area of the image according to a following equation: $M=S\times D$, wherein M represents the modified saturation value of the pixel, S represents the original saturation value of the pixel, and D represent the deviation level.

7. The method of claim 1 further comprising calculating a global gain for the area of the image by the processor.

8. The method of claim 7 wherein calculating the modified saturation value of the pixel in the area of the image according to the deviation level of the pixel in the area of the image and the original saturation value of the pixel in the area of the image to achieve saturation adjustment of the pixel in the area of the image is calculating the modified saturation value of the pixel in the area of the image according to the deviation level of the pixel in the area of the image, the global gain, and the original saturation value of the pixel in the area of the image to achieve saturation adjustment of the pixel in the area of the image.

9. The method of claim 8 wherein calculating the modified saturation value of the pixel in the area of the image according to the deviation level of the pixel in the area of the image, the global gain, and the original saturation value of the pixel in the area of the image to achieve saturation adjustment of the pixel in the area of the image comprises calculating the modified saturation value of the pixel in the area of the image according to a following equation: $M=S\times G\times D$, wherein M represents the modified saturation value of the pixel, S represents the original saturation value of the pixel, G represents the global gain, and D represents the deviation level.

10. The method of claim 8 wherein calculating the modified saturation value of the pixel in the area of the image according to the deviation level of the pixel in the area of the image, the global gain, and the original saturation value of the pixel in the area of the image to achieve saturation adjustment of the pixel in the area of the image comprises calculating the modified saturation value of the pixel in the area of the image according to a following equation: $M=S\times[1+(G-1)\times D]$, wherein M represents the modified saturation value of the pixel, I represents the original saturation value of the pixel, G represents the global gain, and D represents the deviation level.

11. A method for adjusting contrast of an area of an image, comprising:
    calculating a local contrast of a pixel set in a vicinity of a pixel by a processor, wherein the pixel is selected from the area and the pixel set is distributed in a portion of the area;
    calculating a global gain for the area according to brightness characteristic of the area by the processor; and
    calculating a modified brightness value of the pixel according to the local contrast, the global gain and an original brightness value of the pixel by the processor, so that contrast of the pixel is adjusted with the modified brightness value of the pixel.

12. The method of claim 11 wherein the local contrast is defined by a deviation level of the pixel, and the deviation level indicates brightness differences among the pixel and the pixel set in the vicinity of the pixel.

13. The method of claim 12 wherein the deviation level is determined according to a local gain.

14. The method of claim 12 wherein calculating the deviation level of the pixel in the area comprises:
    weighted-averaging brightness values of the pixels in the pixel set for generating an average brightness value; and
    comparing the original brightness value with the average brightness value for generating the deviation level.

15. The method of claim 14 wherein weighted-averaging brightness values of the pixels in the pixel set for generating the average brightness value comprises:
- multiplying a brightness value of each pixel in the pixel set respectively by a preset weighted factor;
- summing up multiplied brightness values of all pixels in the pixel set for generating a sum result; and
- dividing the sum result by a number of the pixels in the pixel set for generating the average brightness value.

16. The method of claim 14 wherein comparing the original brightness value with the average brightness value for generating the deviation level comprises:
- dividing the original brightness value of the pixel by the average brightness value for generating an brightness variation;
- adjusting the brightness variation to generate an adjusted brightness variation; and
- generating the deviation level according to a following equation: $D=1+C \times F$, wherein D represents the deviation level, C represents a local gain, and F represents the adjusted brightness variation.

17. The method of claim 14 wherein comparing the original brightness value with the average brightness value for generating the deviation level comprises:
- dividing the original brightness value of the pixel by the average brightness value and an anti-noise factor for generating an brightness variation;
- adjusting the brightness variation to generate an adjusted brightness variation; and
- generating the deviation level according to a following equation: $D=1+L \times F$, wherein D represents the deviation level, L represents a local gain, and F represents the adjusted brightness variation.

18. The method of claim 12 wherein calculating a modified brightness value of the pixel according to the deviation level, the global gain and the original brightness value of the pixel comprises calculating a modified brightness value of the pixel according to a following equation: $M=I \times G \times D$, wherein M represents the modified brightness value of the pixel, I represents the original brightness value of the pixel, G represents the global gain, and D represents the deviation level.

19. The method of claim 12 wherein calculating a modified brightness value of the pixel according to the deviation level, the global gain and the original brightness value of the pixel comprises calculating a modified brightness value of the pixel according to a following equation: $M=I \times [1+(G-1) \times D]$, wherein M represents the modified brightness value of the pixel, I represents the original brightness value of the pixel, G represents the global gain, and D represents the deviation level.

20. The method of claim 11 wherein the pixel set is determined by a predetermined rule.

* * * * *